United States Patent [19]

Giannone

[11] 4,392,521
[45] Jul. 12, 1983

[54] SIMPLIFIED ADJUSTABLE TIRE CHAIN

[76] Inventor: Victor S. Giannone, 7 Fox Hill Rd., Peekskill, N.Y. 10566

[21] Appl. No.: 410,416

[22] Filed: Aug. 23, 1982

Related U.S. Application Data

[63] Continuation-in-part of Ser. No. 315,960, Oct. 28, 1981.

[51] Int. Cl.³ ............... B60C 27/00; B60C 27/06; B60C 27/10
[52] U.S. Cl. .................. 152/218; 152/233; 152/222; 29/452; 29/509; 29/515
[58] Field of Search ............ 152/217, 218, 219, 221, 152/222, 231, 233, 239, 241, 242; 24/68 TT, 115 H, 128, 265 EE, 265 R, 129, 143 R; 43/44.89, 44.95, 44.98; 29/446, 452, 509, 515

[56] References Cited

U.S. PATENT DOCUMENTS

| 909,448 | 1/1909 | Peirce | 24/128 R |
|---|---|---|---|
| 1,295,669 | 2/1919 | Addison | 152/242 |
| 1,495,982 | 6/1924 | Blough | 152/239 |
| 2,453,325 | 11/1948 | Karstens | 152/239 |
| 4,055,210 | 10/1977 | Mongault | 152/219 |
| 4,185,674 | 1/1980 | Giannone | 152/218 |

FOREIGN PATENT DOCUMENTS

| 551554 | 10/1956 | Belgium | 152/219 |
|---|---|---|---|
| 60945 | 6/1939 | Norway | 152/239 |
| 73914 | 3/1932 | Switzerland | 152/239 |

Primary Examiner—Edward C. Kimlin
Assistant Examiner—F. K. Wine
Attorney, Agent, or Firm—Curtis Ailes

[57] ABSTRACT

Metal cross chains are interconnected on the inboard side by an inboard rope connector and on the outboard side by an outboard rope connector. Each interconnection of a rope connector with a cross chain includes a combined rope-to-cross chain connecting link and rope clamping ring and rope connector adjustment device having a substantially V-shaped wire body with a loop formed at each end of the V. One of the end loops is firmly clamped to the rope connector and the other one of the loops partially surrounds and slidably engages the rope connector and is open sufficiently to permit the rope to be slipped out of that loop. A collar is clamped to the rope at a position to maintain a loop in the rope between the two connecting link loops when the collar is inside the slidably engaged loop, and to permit the rope loop to be released when the collar is positioned outside of the slidably engaged connecting link loop.

16 Claims, 12 Drawing Figures

SIMPLIFIED ADJUSTABLE TIRE CHAIN

CROSS REFERENCE TO RELATED APPLICATION

This application is a continuation in part of prior application Ser. No. 315,960 filed Oct. 28, 1981.

The invention particularly relates to new and novel tire chain structures of the type having non-metallic interconnectors for the cross chains.

BACKGROUND OF THE INVENTION

Conventional tire chains are heavy, difficult to mount upon the tire, and are difficult to tighten upon the tire so that they often remain loose and subject to banging against the fender of the vehicle in a most unsatisfactory and disturbing manner, subjecting the chain to breakage, subjecting the vehicle to damage, and often limiting the maximum speed of the vehicle while the chains are mounted.

Because of all of these disadvantages, various proposals have been made in the past for vehicle tire chain structures employing non-metallic connectors between the cross chains. A number of such structures have been devised by the present inventor, as shown in his prior U.S. Pat. Nos. 3,856,069, 3,858,634, 3,970,132, and 4,185,674 issued Jan. 29, 1980. The present invention represents an improvement over those prior structures.

One of the major problems in all tire chain structures, including structures employing non-metallic cross chain connectors, is to provide for ease of adjustment in the size of the tire chain structure to exactly fit a particular tire, without requiring an infinite number of different sizes to fit all of the different tire sizes. Another closely related problem is that of tightening the tire chain structure after it is assembled upon the tire.

Accordingly, it is a major object of the present invention to provide improved and simplified means for adjusting the size and tightness of vehicle tire chain structures having non-metallic connectors for the cross chains.

Another object of the present invention is to provide an improved vehicle tire chain structure employing non-metallic interconnectors for the cross chains in which the connections to the cross chains are very easily made, and wherein the points of attachment of the non-metallic connectors to the cross chains are maintained in a substantially fixed position during mounting and use of the structure.

Another object of the invention is to provide an improved tire chain structure in which the cross chains are more easily reversed or replaced when worn or broken.

The last issued of the above listed patents, U.S. Pat. No. 4,185,674 is directed to a tire chain invention for which the objectives are very similar to those listed above, and the structure of that invention substantially fulfills those objectives. However, it is a further objective of the present invention to provide for fulfillment of all of the above mentioned objectives with a greatly simplified structure which provides for greater ease of assembly and lower cost, while at the same time providing superior results.

Other objects and advantages of the invention will be apparent from the following description and the accompanying drawings.

SUMMARY OF THE INVENTION

In particular fulfillment of the last mentioned of the specific objectives listed above, the functions of a number of separate components provided for in the prior U.S. Pat. No. 4,185,674 are combined in the present invention in a single component. The single component is a combined rope to cross chain connecting link and rope connector adjustment device.

Stated more specifically, in carrying out the invention there is provided an adjustable size tire chain structure comprising a plurality of metal cross-chains, an inboard rope connector for interconnection with the inboard ends of said cross-chains, an outboard rope connector for interconnection with the outboard ends of said cross-chains, a combined rope to cross-chain connecting link and rope clamping ring and rope connector adjustment device provided at each end of each cross-chain for connection to said inboard and outboard rope connectors, each of said connecting links comprising a substantially V-shaped wire body with a loop formed at each end of the V, said wire body being connected to the associated cross-chain end by linking through the end link at the bottom of the V, said loops each being engaged with the associated one of said rope connectors by at least partially surrounding the rope of said rope connector, one of said loops being firmly clamped to said rope and the other one of said loops being dimensioned and arranged to partially surround and slidably engage said rope, said slidably engaged loop being open sufficiently to permit the rope to be slipped out of and into said loop, a collar clamped to said rope at a position upon said rope on the side of said slidably engaged loop opposite to the side of said firmly clamped loop when said rope is stretched from said clamped loop to said collar, said collar being sufficiently large to prevent the rope from sliding through said slidably engaged loop when said rope is placed into said slidably engaged loop with said collar on the side of said slidably engaged loop facing said clamped loop to thereby maintain a loop of rope between said clamped loop and said slidably engaged loop to thereby shorten said rope connector.

DESCRIPTION OF PREFERRED EMBODIMENTS

Figure 1:
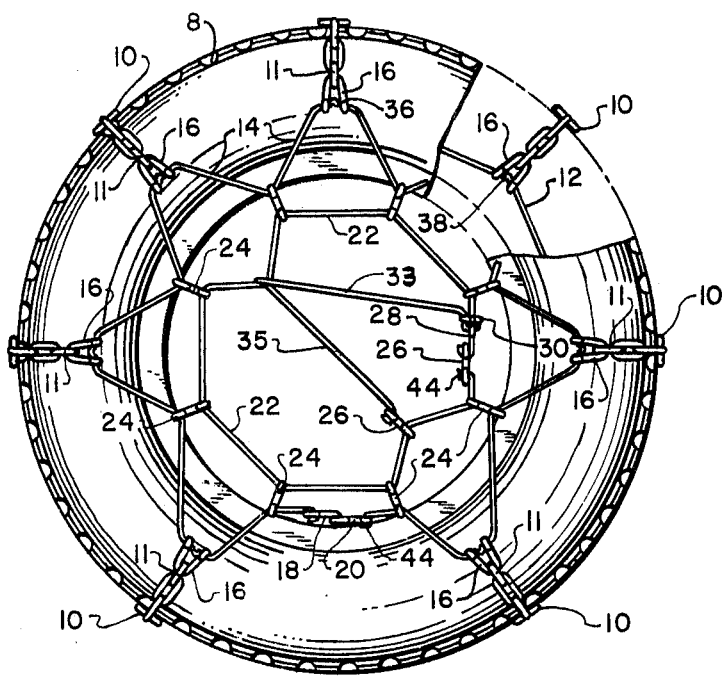
FIG. 1 is a side view of the simplified adjustable size tire chain as it appears when installed on a tire.

A preferred embodiment of the adjustable size tire chain structure of the present invention is shown in assembled form upon a tire 8 in FIG. 1. As shown, the preferred structure preferably includes a plurality of metal chains 10, an inboard rope connector 12 for interconnection with the inboard ends of cross chains 10 and an outboard rope connector 14 for interconnection with the outboard ends of the cross chains 10. The inboard rope connector 12 is shown only in a cutaway portion of the tire 8. FIG. 1 is a view of the tire 8 from the outboard side. A connecting link 16 is provided at each end of each cross chain 10 for connection to the inboard and outboard rope connectors 12 and 14. The connecting link 16 is really a combined rope to cross chain connecting link and rope clamping ring and rope connection adjustment device, as will appear from the following detailed description.

The connecting links 16 are each connected to an associated end link 11 of the cross chains 10 by threading through the end link 11.

The respective ends of each of the inboard and outboard rope connectors are provided with metal wire interconnection hooks 18 and 20 to enable these ends to be interconnected as the chain structure is assembled upon the tire 8.

A spreader rope 22 is connected around the outboard rope connector 14 to provide a final tightening of the outboard rope connector 14, and to thereby tighten the entire chain structure. The spreader rope 22 is preferably interconnected with the outboard rope connector 14 by means of spreader hooks 24, with at least one spreader hook 24 being connected to each segment of the outboard rope connector 14 between adjacent connecting links 16. As shown in the drawing, two spreader hooks may preferably be provided on the opposite sides of the interconnection hooks 18 and 20, although that is not essential. The tightening provided by the spreader rope 22 tightens the entire structure so that no spreader rope is required for the inboard rope connector 12.

As shown in the drawing, the spreader rope 22 is provided with end hooks 26 at each end, and an intermediate connector hook 28. The spreader rope 22 is arranged circumferentially around the outboard rope connector, and one of the spreader end hooks 26 is connected to the intermediate connector hook 28. The other end of the spreader rope 22 is tightened by means of a locking ring 30 associated with the intermediate connector hook 28 by pulling the spreader rope tightly through the intermediate connector hook 28 and the locking ring 30. The loose end of the spreader rope 22 may then be connected diagonally across the array formed by the rope connector 14 and the spreader rope 22, as shown at 33, and doubled back, as shown at 35, with the spreader end hook 26 connected to one of the spreader hooks 24, or to the body of the spreader, to maintain the entire assembly in a tight condition.

Figure 2:
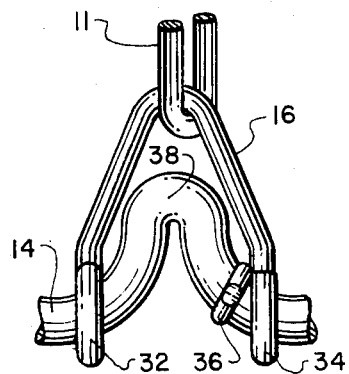
FIG. 2 is a detail view of a combined rope to cross chain connecting link and rope clamping ring and rope connector adjustment device which forms a part of the structures of FIG. 1.
Figure 3:
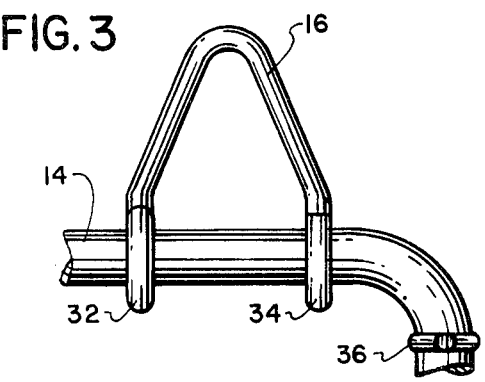
FIG. 3 is a detail view corresponding to FIG. 2, and showing the adjustment of the rope connector to be longer by releasing a loop in the rope connector.
Figure 4:
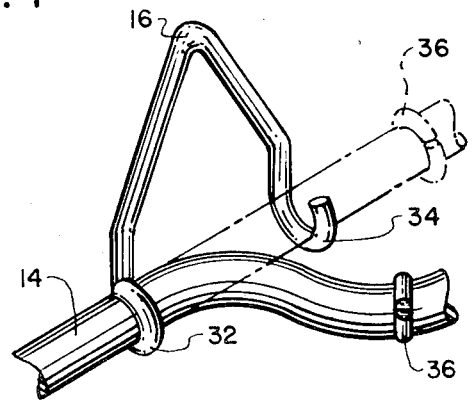
FIG. 4 is a perspective view corresponding to FIGS. 2 and 3, and showing how the rope connector may be partially disconnected from the connecting link for accomplishing the adjustment illustrated by the difference between FIGS. 2 and 3.
Figure 5:
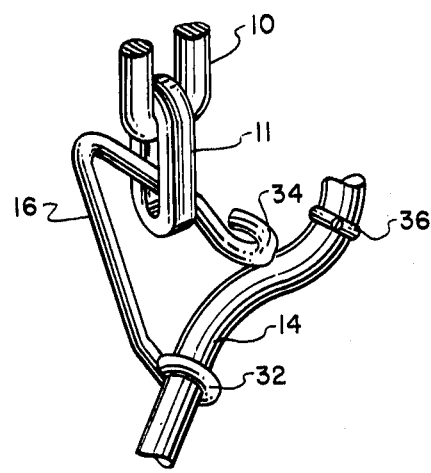
FIG. 5 illustrates how the connecting link of FIGS. 2, 3, and 4 can be easily connected and disconnected at the end link of the cross chain.

FIG. 2 is an enlarged detail view of the connecting link 16, showing how that connecting link is attached to the end link 11, and illustrating how the connecting link is attached to the outboard rope connector 14. The structure is exactly the same for the interconnection of the connecting links 16 to the inboard rope connector 12. FIGS. 3, 4, and 5 all illustrate different aspects of the connecting link 16 and its relationship to the rope connector 14.

As illustrated in FIG. 2, the connecting link 16 is in the form of a substantially V-shaped wire body with individual loops 32 and 34 formed at the respective ends of the V. The mid-portion of the V is engaged with the end link 11 of the associated cross chain 10. As shown in FIG. 2, the V is inverted.

Each of the end loops 32 and 34 is formed in a plane substantially perpendicular to the plane of the V. Thus, in FIG. 2, the plane of the V is substantially parallel to the plane of the surface of the paper, and the planes of the loops 32 and 34 are substantially perpendicular to the plane of the paper. This relationship, and the construction of the loops 32 and 34 can be appreciated a little better from the perspective view of FIG. 4. The loops 32 and 34 are arranged to engage and embrace the rope connector 14 by at least partially surrounding the rope of the rope connector. Loop 32 is securely clamped to the rope connector 14 so as to prevent any movement or sliding of the rope 14 through loop 32. For this purpose, loop 32 preferably substantially completely surrounds the body of the rope 14.

By contrast, loop 34 is dimensioned and arranged to only partially surround and slidably engage the body of the rope 14. Loop 34 is open sufficiently to permit the rope to be slipped out of and into loop 34 for two different purposes, as will be described immediately below.

A collar ring 36 is tightly fixed to the body of the rope, as illustrated in each of the FIGS. 2, 3, 4, and 5. Collar 36 may simply consist of an open wire ring which is securely clamped to the body of the rope 14. When the rope connector 14 is to be shortened, the rope connector is gathered into a loop, as indicated at 38, and the body of the rope connector is then slipped into the loop 34 with the collar 36 on the inside of the loop 34 of the connecting link 16, as illustrated in FIG. 2. In this position, when the rope connector 14 is under tension, the collar 36 prevents the body of the rope connector 14 from sliding through the loop 34, thus maintaining the rope loop 38. The rope loop 38 cannot be released by sliding the body of the rope connector 14 through loop 32 because the body of rope 14 is tightly clamped by loop 32 to prevent any sliding motion.

If the rope connector 14 is to be lengthened, the body of the rope 14 is slipped out of the opening of loop 34 by an upward movement, the rope loop 38 is straightened out, and the body of the rope connector 14 is again inserted into the loop 34, as shown in FIG. 3. Thus, the rope connector 14 is lengthened by the amount of rope released by the release of loop 38. This operation is further illustrated in the perspective view of FIG. 4, where the rope connector 14 is shown in full after release from the loop 34, and is shown in phantom after reinsertion into the loop 34. Since the body of the rope 14 is slidably engaged within the loop 34, any tendency of the rope to retain the rope loop 38 is overcome by the longitudinal tension on the rope connector 14.

If it is desired to again shorten the rope connector, the process can be reversed. Thus, the rope body can be slipped out of the loop 34, as shown in FIG. 4, and then the rope body may be slipped back into the loop 34 with the collar 36 inside the loop 34, as pictured in FIG. 2.

It may be said that the collar 36 is clamped to the rope at a position upon the rope on the side of the slidably engaged loop 34 opposite to the side of the firmly clamped loop 32 when the rope is stretched from the clamped loop to the collar. This represents the condition illustrated in full lines in FIG. 4. However, the collar 36 is sufficiently large to prevent the rope from sliding through the slidably engaged loop 34 when the rope is placed into the slidably engaged loop 34 with the collar 36 on the side of the slidably engaged loop 34 facing the clamped loop 32. This maintains the rope loop 38 between the clamped loop 32 and the slidably engaged loop 34 to thereby shorten the rope connector.

Therefore, as described above, the connecting link 16 provides the combined functions of connecting the rope connector 34 to the cross chain 10, clamping the rope connector 14 effectively to the cross chain 10 by the firm clamping of loop 32, and providing a rope connector adjustment device in terms of the feature just described for maintaining or eliminating the rope loop 38. The firm clamping of the clamped loop 32 serves to maintain the exact position of the connecting link upon the rope connector 14 so as to maintain the different connecting links in proper spaced relationship with one another. This serves to assist in positioning the chain cross links 10 appropriately around the tire.

FIG. 5 illustrates another major feature and advantage of the structure of the connecting link 16. Thus, while the body of the rope connector 14 is out of the loop 34, the end of the connecting link 16, including the loop 34, may be threaded in and out of the end link 11 of the cross chain 10 to permit the cross chain 10 to be replaced with a new chain, or to reverse the cross chain 10 to distribute the wear upon the cross chain. This can be easily accomplished without the necessity for the use of any tools. This is the second purpose for which the body of the rope connector may be slipped out of the end loop 34, to change or reverse the cross chain 10. This feature not only permits ease in changing or reversing the cross chains, but also provides for great ease in the initial assembly of the tire chain structure.

Figure 6:
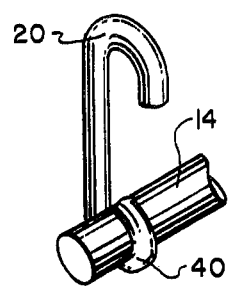
FIGS. 6, 7, 8 and 9 illustrate the preferred steps in a process of connecting a rope end to a device including a clamp member, in a process which forms a part of the present invention.
Figure 7:
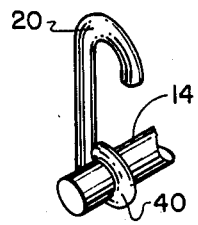

FIGS. 6, 7, 8, and 9 disclose another novel feature of the invention and of a method for carrying out that feature. The rope connectors 14 are preferably composed of thermoplastic synthetic resin fibers such as polypropylene. The end hooks, such as end hook 20, for interconnecting the ends of the rope connectors 12 and 14 are attached to the rope connector ends by a process illustrated in stepwise fashion in FIGS. 6, 7, 8, and 9. First, the end of the rope connector 14 is slipped into a hook loop 40 formed at one end of the hook 20, as shown in FIG. 6. Next, as illustrated in FIG. 7, the hook loop 40 is firmly clamped to the body of the rope connector 14.

Figure 8:
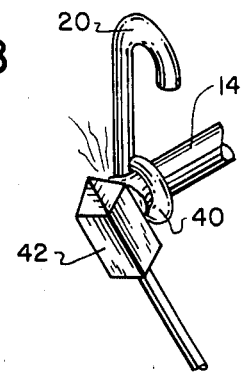

As illustrated in FIG. 8, in the next step, a heated implement such as a soldering iron 42 is then forcefully applied to the end of the thermoplastic rope 14, fusing the ends of the fibers of the rope together, and upsetting and enlarging the end of the rope so as to make it impossible for the end of the rope to slip out of the clamp loop 40.

Figure 9:
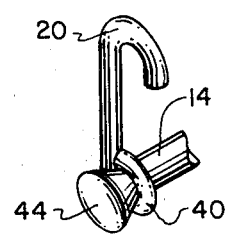

FIG. 9 illustrates the completed assembly, with the fused and upset end of the polypropylene rope indicated at 44.

While a soldering iron 42 is illustrated as the heating and upsetting tool in FIG. 8, it will be understood that any suitable heating implement may be employed for the purpose. For instance, the combination of the hook 20 and the end of the rope connector 14 can be grasped by means of a pair of pliers, or by means of an automatic fixture, and forceably pressed against the surface of an electric hotplate, the hotplate then providing the function of the heating and upsetting tool.

The hook 20 is preferably composed of steel, but other materials may also be employed for this purpose.

The basic method of assembly of the entire chain structure preferably includes the steps of prefabricating the required number of the V shaped wire body connecting links 16, including forming the loops 32 and 34 at each end of the V of each of the connecting links 16, and attaching equal numbers of the connecting links to the inboard and outboard rope connectors 12 and 14.

The attachment of the connecting links to the inboard and outboard rope connectors is carried out by inserting the body of the rope connector into loop 32 of each of the associated connecting links, with the associated connecting links substantially equally spaced along each rope connector. Loop 32 is then firmly closed on each connecting link to firmly clamp the rope within that loop. The separate collar 36 is then clamped at a position upon each rope connector adjacent to each connecting link on the side of the unclamped loop 34 facing away from the clamped loop 32.

Figure 10:
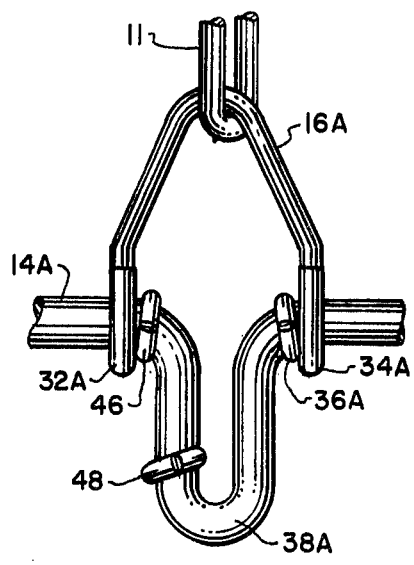
FIGS. 10, 11, and 12 disclose a modified version of the connecting link of FIGS. 2, 3 and 4 and the rope connector associated therewith.
Figure 11:
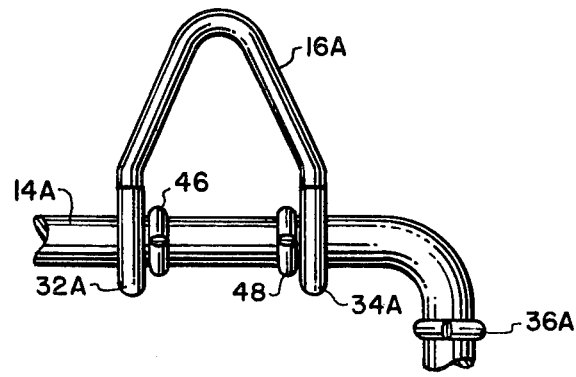
Figure 12:
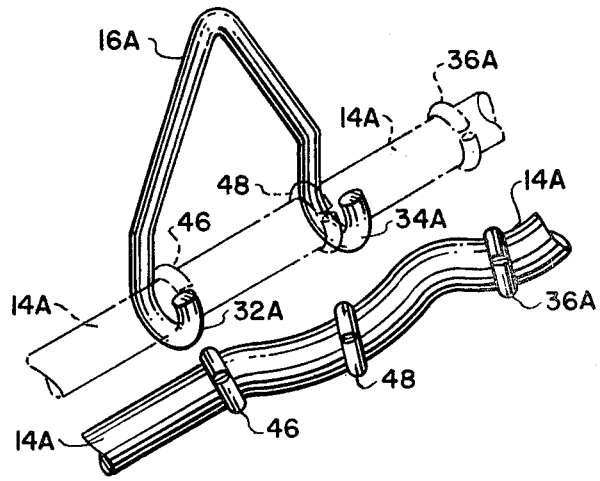

Each connecting link is then attached to one end of each member of a group of cross chains 10 by threading the unclamped loop 34 through the end link 11 of the cross chain. Each connecting link associated with the other one of the rope connectors is then connected in the same manner to the other end of each of the cross chains 10. The body of each rope connector is then slid into the unclamped loop 34 of each associated connecting link with the collar 36 being selectively placed on the side of the unclamped loop 34 facing the clamped loop 32 to shorten the rope connector by maintaining the rope loop 38, or with the collar 36 on the other side of the unclamped loop 34 when the rope connector need not be shortened. FIGS. 10, 11, and 12 present a minor modification of the structure of the connecting link 16 previously illustrated and described in connection with FIGS. 2, 3, and 4. In FIGS. 10, 11, and 12, the parts of the previously described connecting link structure, and associated rope, are given the same numbers, but with the suffix letter "A".

The main difference in the embodiment of FIGS. 10, 11, and 12 is that the loop 32A of the connecting link 16A is not securely clamped to the rope connector 14A, but is demensioned and arranged to only partially surround and to slidably engage the body of the rope 14A, as previously described above for loop 34. Thus, loops 32A and 34A are substantially identical, permitting a sliding engagement with the rope 14A, and preferably permitting insertion or removal of the rope, when desired.

However, in order to maintain the longitudinal position of the rope 14A within the connecting link 16A, two additional collars 46 and 48 are provided, as best illustrated in FIG. 11. The collars 46 and 48 are securely clamped to the rope 14A, as previously described above with respect to the collar 36. As illustrated in FIG. 11, when the section of rope between the loops 32A and 34A is straight, the two collars 46 and 48 are positioned inside the respective loops 32A and 34A to prevent longitudinal movement of the rope 14A with respect to the link 16A. However, as illustrated in FIG. 10, when both of the outer collars 46 and 36A are positioned inside the loops 32A and 34A, a loop of rope 38A is formed between loops 32A and 34A of the connecting link 16A to thereby shorten the rope.

The collars 46 and 36A are sometimes referred to below as outer collars, and the collar 48 as a middle collar.

In the method of assembly of the modified connecting links 16A of FIGS. 10, 11, and 12, the connecting link 16A may first be connected to the end link 11 of the cross chain, and then connected to the appropriate section of the rope 14A. Alternatively, one of the loops 32A may be connected to the rope 14A, and then the other side of the connecting link 16A can be threaded through the end link 11 of the cross chain, and then fastened to the rope 14A.

While this invention has been shown and described in connection with particular preferred embodiments, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of this invention.

What is claimed is:

1. An adjustable size tire chain structure comprising a plurality of metal cross chains each having an end link at each end,
an inboard rope connector for interconnection with the inboard ends of said cross chains,
an outboard rope connector for interconnection with the outboard ends of said cross chains,
a combined rope to cross chain connecting link and rope clamping ring and rope connector adjustment device provided at each end of each cross chain for connection to said inboard and outboard rope connectors,
each of said connecting links comprising
a substantially V-shaped wire body with a loop formed at each end of the V,
said wire body being connected to the associated cross chain end by linking through the end link at the bottom of the V,
said loops each being engaged with the associated one of said rope connectors by at least partially surrounding the rope connector,
both of said loops being dimensioned and arranged to partially surround and slidably engage said rope,
each of said slidably engaged loops being open sufficiently to permit the rope to be slipped out of and into said loop,
a set of at least three collars clamped to said rope at spaced positions upon said rope in the vicinity of each of said connecting links with at least two of the three collars positioned between the loops of the associated connecting link,
each of said collars being sufficiently large to prevent the portion of the rope to which the collar is clamped from sliding through either of said slidably engaged loops, one of the outer ones of said collars and the middle one of said collars being spaced apart to respectively fit between said loops and to fit in closely spaced relationship to the inner sides of said two loops to prevent longitudinal movement of said rope with respect to said link when the section of rope between said loops is straight, the other outer one of said collars being operable when positioned inside the adjacent loop of said link in conjunction with the positioning of the first outer collar inside the other loop to shorten the rope by forming a loop of rope between said loops of said link.

2. A structure as claimed in claim 1 wherein
at least one of said slidably engaged loops of each of said connecting links is open sufficiently to permit connection and disconnection of said connecting link to the associated end link of the cross chain by disengagement of the rope from said slidably engaged loop and by threading said slidably engaged loop portion of said connecting link through the end link of the cross chain.

3. A structure as claimed in claim 1 wherein
there is provided a plurality of spreader hooks with at least one spreader hook being connected to each segment of said outboard rope connector extending between adjacent connecting links,
and a spreader rope interconnecting all of said spreader hooks for pulling said spreader hooks radially inwardly to thereby tighten said outboard rope connector and to thereby tighten the entire chain structure.

4. A structure as claimed in claim 1
wherein said inboard and outboard rope connectors consist essentially of a thermoplastic synthetic resin material and
wherein the respective ends of each of said inboard and outboard rope connectors are provided with metal wire interconnection hooks,
the attachment of each of said last mentioned hooks being carried out by securely clamping a wire loop of each of said hooks around the associated rope body near the end and by fusing the end of the rope beyond said clamped portion of said hook and upsetting said fused end of said rope while it is at least partially in the fused state to enlarge the fused end to prevent disengagement of said wire hook from said rope by having the wire hook slide off of the fused end of the rope.

5. A structure as claimed in claim 4
wherein the synthetic resin material of said rope connectors is a polypropylene,
said loops each being dimensioned and arranged for engagement with an associated one of said rope connectors by partially surrounding the rope connector, at least one of said slidably engaged loops being open sufficiently to permit the rope to be slipped out of and into said loop to permit the end of said connecting link including the slidably engaged loop to be threaded through the end link of the associated cross chain.

6. A device as claimed in claim 1
wherein each of said end loops of each of said connecting links is formed in a plane substantially perpendicular to the plane of the V-shape.

7. A method of assembling an adjustable size tire chain structure comprising the steps of prefabricating a plurality of substantially V-shaped wire body connecting links,
forming a loop at each end of the V of each connecting link in a plane substantially perpendicular to the plane of the V to accommodate the body of a rope connector,
clamping a plurality of groups of at least three separate collars at spaced positions upon each of two rope connectors with the groups of collars being positioned to coincide with substantially equally spaced desired positions of the connecting links on the rope connectors, attaching each connecting link to one end of each of a group of cross chains each having an end link at each end by threading one loop of the connecting link through the end link of the cross chain so that each cross chain has a connecting link at each end, sliding the body of one rope connector into the loops of all of the connecting links connected to one set of ends of the cross chains, sliding the body of the other rope connector into the loops of all of the connecting links connected to the other set of ends of the cross chains, the connections of the rope connectors to the loops each being in proximity to a group of three clamped collars, the clamped collars being selectively placed with three collars between the loops to shorten the associated rope connector or with two collars between the loops to lengthen the associated rope connector.

8. An adjustable size tire chain structure comprising a plurality of metal cross chains each having an end link at each end, an inboard rope connector for interconnection with the inboard ends of said cross chains, an outboard rope connector for interconnection with the outboard ends of said cross chains, a combined rope to cross chain connecting link and rope clamping ring and rope connector adjustment device provided at each end of each cross chain for connection to said inboard and outboard rope connectors, each of said connecting links comprising a substantially V-shaped wire body with a loop formed at each end of the V, said wire body being connected to the associated cross chain end by linking through the end link at the bottom of the V, said loops each being engaged with the associated one of said rope connectors by at least partially surrounding the rope of said rope connector, one of said loops being firmly clamped to said rope and the other one of said loops being dimensioned and arranged to partially surround and slidably engage said rope, said slidably engaged loop being open sufficiently to permit the rope to be slipped out of and into said loop, a collar clamped to said rope at a position upon said rope on the side of said slidably engaged loop opposite to the side of said firmly clamped loop when said rope is stretched from said clamped loop to said collar, said collar being sufficiently large to prevent the rope from sliding through said slidably engaged loop when said rope is placed into said slidably engaged loop with said collar on the side of said slidably engaged loop facing said clamped loop to thereby maintain a loop of rope between said clamped loop and said slidably engaged loop to thereby shorten said rope connector.

9. A structure as claimed in claim 8 wherein said slidably engaged loop of each of said connecting links is open sufficiently to permit connection and disconnection of said connecting link to the associated end link of the cross chain by disengagement of the rope from said slidably engaged loop and by threading said slidably engaged loop portion of said connecting link through the end link of the cross chain.

10. A structure as claimed in claim 8 wherein there is provided a plurality of spreader hooks with at least one spreader hook being connected to each segment of said outboard rope connector extending between adjacent connecting links, and a spreader rope interconnecting all of said spreader hooks for pulling said spreader hooks radially inwardly to thereby tighten said outboard rope connector and to thereby tighten the entire chain structure.

11. A structure as claimed in claim 8 wherein said inboard and outboard rope connectors consist essentially of a thermoplastic synthetic resin material and wherein the respective ends of each of said inboard and outboard rope connectors are provided with metal wire interconnection hooks, the attachment of each of said last mentioned hooks being carried out by securely clamping a wire loop of each of said hooks around the associated rope body near the end and by fusing the end of the rope beyond said clamped portion of said hook and upsetting said fused end of said rope while it is at least partially in the fused state to enlarge the fused end to prevent disengagement of said wire hook from said rope by having the wire hook slide off of the fused end of the rope.

12. A structure as claimed in claim 11 wherein the synthetic resin material of said rope connectors is a polypropylene.

13. A combined rope to cross chain connecting link and rope clamping ring and rope connector adjustment device for use at each end link of each cross chain in a tire chain structure for connection of the cross chains to inboard and outboard rope connectors, said connecting link comprising a substantially V-shaped wire body with a loop formed at each end of the V, said wire body being adapted for connection to the associated cross chain end by linking through the end link at the bottom of the V, said loops each being adapted for engagement with an associated one of said rope connectors by at least partially surrounding the rope of the rope connector, one of said loops being arranged to be firmly clamped to the rope and the other one of said loops being dimensioned and arranged to partially surround and slidably engage the rope, said slidably engaged loop being open sufficiently to permit the rope to be slipped out of and into said loop to permit the end of said connecting link including the slidably engaged loop to be threaded through the end link of the associated cross chain.

14. A device as claimed in claim 13 wherein each of said end loops of the V is formed in a plane substantially perpendicular to the plane of the V.

15. A method of assembling an adjustable size tire chain structure comprising the steps of prefabricating a plurality of substantially V-shaped wire body connecting links, forming a loop at each end of the V of each connecting link in a plane substantially perpendicular to the plane of the V, dividing the connecting links into two groups which are equal in number and combining each group with a separate rope connector by inserting the body of the rope connector into one of the loops of each of the associated connecting links with the associated connecting links substantially equally spaced along the rope connector, firmly closing the loop of each connecting link into which the rope has been inserted to firmly clamp the rope within that loop, clamping a separate collar at a position upon each rope connector on the side of the unclamped loop facing away from the clamped loop of each connecting link, attaching each connecting link attached to one of said rope connectors to one end of each of a group of cross chains by threading the unclamped loop of the connecting link through the end link of the cross chain, attaching each connecting link of the other one of said rope connectors in the same manner to the other end of each of said cross chains, and then sliding the body of each rope connector into the unclamped loop of each associated connecting link with the collar placed selectively on the side of the unclamped loop facing the clamped loop to thereby maintain a loop of rope between the clamped loop and the unclamped loop of the connecting link to thereby shorten the rope connector or on the other side of said unclamped loop to lengthen the rope connector.

16. An adjustable size tire chain structure comprising a plurality of metal cross chains each having an end link at each end, an inboard rope connector for interconnection with the inboard ends of said cross chains, an outboard rope connector for interconnection with the outboard ends of said cross chains, a combined rope to cross chain connecting link and rope connector adjustment device provided at each end of each cross chain for connection to said inboard and outboard rope connectors, each of said connecting links comprising a substantially V-shaped wire body with a loop formed at each end of the V, said wire body being connected to the associated cross chain end by linking through the end link at the bottom of the V, said loops each being engaged with the associated one of said rope connectors by at least partially surrounding the rope of said rope connector, one of said loops being dimensioned and arranged to partially surround and slidably engage said rope, said slidably engaged loop being open sufficiently to permit the rope to be slipped out of and into said loops, a collar clamped to said rope at a position upon said rope on the side of said slidably engaged loop opposite to the side of the other one of said loops when said rope is stretched from said other loop to said collar, means to prevent said rope from sliding through said other loop, said collar being sufficiently large to prevent the rope from sliding through said slidably engaged loop when said rope is placed into said slidably engaged loop with said collar on the side of said slidably engaged loop facing said other loop to thereby maintain a loop of rope between said other loop and said slidably engaged loop to thereby shorten said rope connector.

* * * * *

UNITED STATES PATENT AND TRADEMARK OFFICE
CERTIFICATE OF CORRECTION

PATENT NO. : 4,392,521
DATED : July 12, 1983
INVENTOR(S) : VICTOR S. GIANNONE

It is certified that error appears in the above-identified patent and that said Letters Patent are hereby corrected as shown below:

Column 12, line 7,    "loops" should read --loop--.

Signed and Sealed this

First Day of November 1983

[SEAL]

Attest:

GERALD J. MOSSINGHOFF

Attesting Officer     Commissioner of Patents and Trademarks